United States Patent [19]
Niedersteiner

[11] Patent Number: 5,901,968
[45] Date of Patent: May 11, 1999

[54] PEDESTRIAN TRAILER SYSTEM

[76] Inventor: Anton M. Niedersteiner, 8523 33rd Avenue NW, Calgary, Alberta, Canada, T3B 1M2

[21] Appl. No.: 08/803,430

[22] Filed: Feb. 20, 1997

[51] Int. Cl.[6] ................................................. B62D 51/04
[52] U.S. Cl. ............................ 280/1.5; 224/184; 224/660
[58] Field of Search .................................. 280/1.5, 415.1, 280/416, 504; 224/184, 197, 660, 662; 248/289.11; 403/391

[56] References Cited

U.S. PATENT DOCUMENTS

| | | | |
|---|---|---|---|
| D. 338,560 | 8/1993 | Lundy | D3/104 |
| 4,099,657 | 7/1978 | Zufich | 280/1.5 |
| 4,236,723 | 12/1980 | Lemmon | 280/1.5 |
| 4,664,395 | 5/1987 | McCoy | 280/1.5 |
| 4,848,780 | 7/1989 | Straub | 280/1.5 |
| 5,005,844 | 4/1991 | Douglas et al. | 280/1.5 |
| 5,215,318 | 6/1993 | Capraro | 280/1.5 |
| 5,215,355 | 6/1993 | Klumpjan | 298/6 |
| 5,385,355 | 1/1995 | Hoffman | 280/1.5 |

*Primary Examiner*—Daniel G. DePumpo

[57] ABSTRACT

A pedestrian trailer system including a trailer hitch assembly that has a first concave member and a cross bar that is releasably coupled. A body support member is included for positioning around a persons waist. The body support member has a second concave member and a belt member. A plurality of S-shaped bands form a pair of inner bands and a pair of outer bands. Each pair of bands is used to couple the trailer hitch member and the body support member. The pair of inner bands criss-cross when coupled with the first and second concave members. The pair of outer bands criss-cross when coupled with the first and second concave members. Lastly, a trailer member which has a pair of trailer arms is included. The pair of trailer arms have a lower end and an upper member. Each upper member has an opening for allowing the cross bar to be positioned within. The lower end has a wheel. The trailer member is to be pulled by a person when coupled with the cross bar of the trailer hitch member.

9 Claims, 4 Drawing Sheets

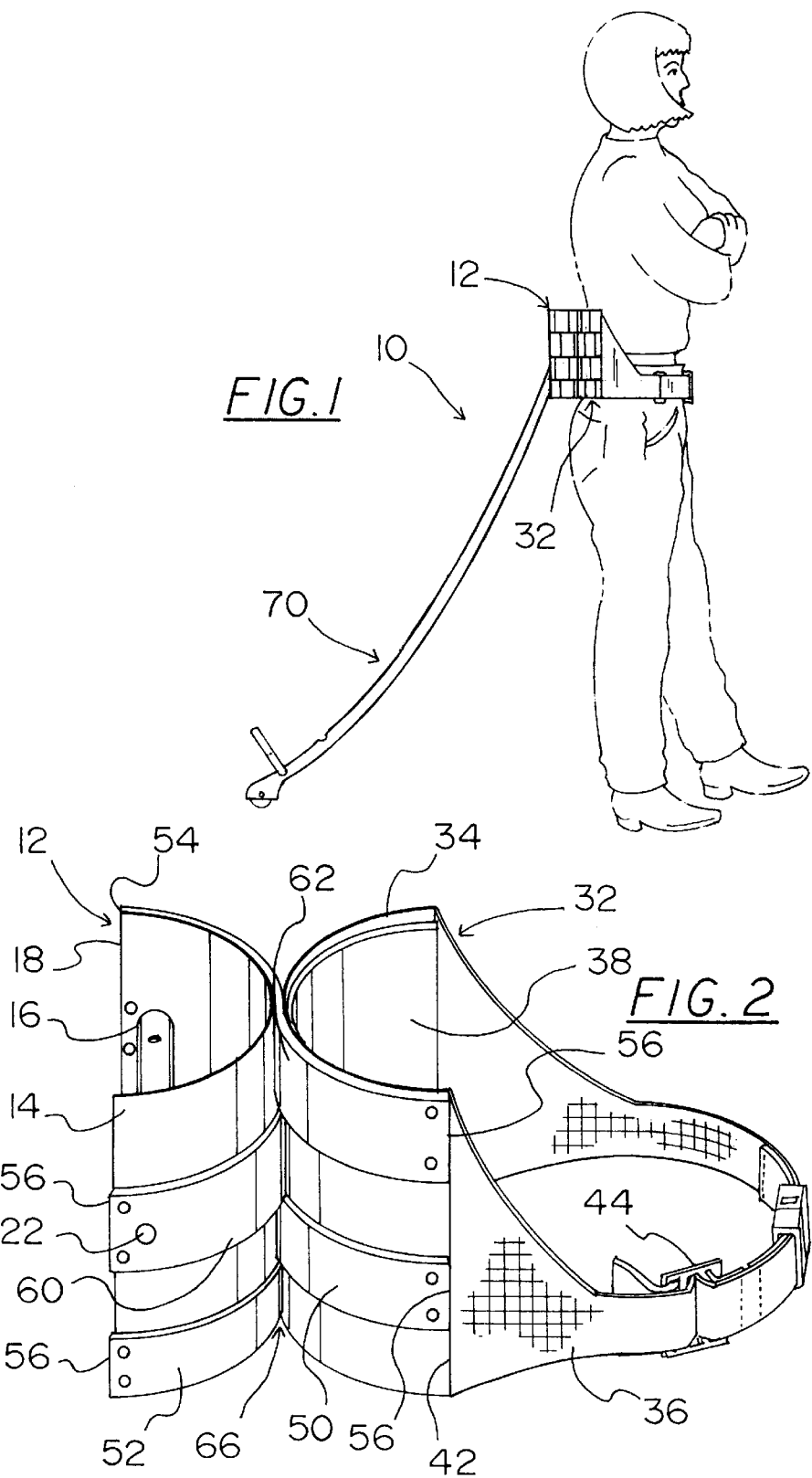

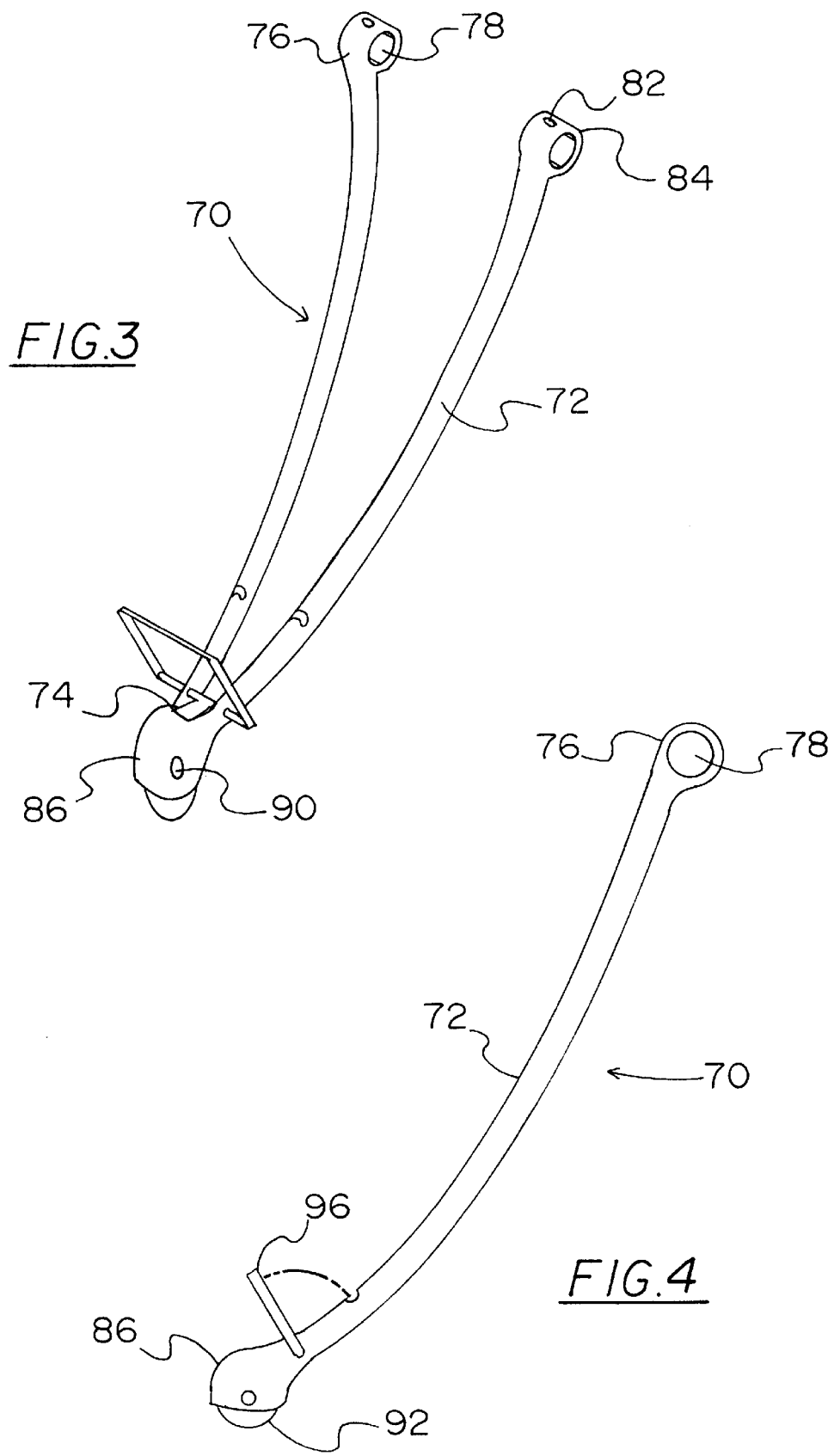

PEDESTRIAN TRAILER SYSTEM

BACKGROUND OF THE INVENTION

1. Field of the Invention

The present invention relates to a pedestrian trailer system and more particularly pertains to providing a system that will allow a person to transport materials without supporting the weight of the material on the body, and further allowing the person to move freely without restriction of movement when the pedestrian trailer system is supported about the waist of the person.

2. Description of the Prior Art

The use of a body trailer is known in the prior art. More specifically, body trailers heretofore devised and utilized for the purpose of transporting items are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,385,355 to Hoffman discloses a monowheel travois. U.S. Pat. No. Des. 338,560 to Lundy discloses a golf cart pulling attachment. U.S. Pat. No. 5,215,355 to Klumpjan discloses a hands-free dumping wagon. U.S. Pat. No. 5,215,318 to Capraro discloses a body trailer. U.S. Pat. No. 5,005,844 to Douglas et al. discloses a travois with roller assembly. Lastly, U.S. Pat. No. 4,848,780 to Straub discloses a carriage assembly for a jogger.

While these devices fulfill their respective, particular objectives and requirements, the aforementioned patents do not describe pedestrian trailer system that allows a trailer hitch assembly to be coupled to a body support member by a plurality of S-shaped bands for the purpose of allowing a trailer to be coupled to the trailer hitch assembly for pulling by the person as they walk or run.

In this respect, the pedestrian trailer system according to the present invention substantially departs from the conventional concepts and designs of the prior art, and in doing so provides an apparatus primarily developed for the purpose of providing a system that will allow a person to transport materials without supporting the weight of the material on the body, and further allowing the person to move freely without restriction of movement when the pedestrian trailer system is supported about the waist of the person.

Therefore, it can be appreciated that there exists a continuing need for a new and improved pedestrian trailer system which can be used for providing a system that will allow a person to transport materials without supporting the weight of the material on the body, and further allowing the person to move freely without restriction of movement when the pedestrian trailer system is supported about the waist of the person. In this regard, the present invention substantially fulfills this need.

SUMMARY OF THE INVENTION

In view of the foregoing disadvantages inherent in the known types of body trailers now present in the prior art, the present invention provides an improved pedestrian trailer system. As such, the general purpose of the present invention, which will be described subsequently in greater detail, is to provide a new and improved pedestrian trailer system and method which has all the advantages of the prior art and none of the disadvantages.

To attain this, the present invention essentially comprises a trailer hitch assembly that has a first concave member and a cross bar. The first concave member has a first pair of side end edges and a pair of side openings. The cross bar has a pair of end post projecting outwardly. Each of the end posts has a threaded interior. One of each end post of the cross bar is positioned within one of each of the side openings for releasable coupling with the first concave member. Included is a body support member that has a second concave member and a belt member. The second concave member has a second pair of side end edges. The belt member is fixedly attached to the second pair of side end edges. The belt member has an adjustable buckle for releasable coupling of the belt member around a person's waist. At least two, preferably four S-shaped bands are provided. Each band has a first connecting end and a second connecting end. The four S-shaped bands form a pair of inner bands and a pair of outer bands that are used for coupling the trailer hitch member and the body support member. One of the inner bands has the first connecting end coupled with one of the second pair of side end edges, of the second concave member, and the second connecting end coupled with one of the first pair of side end edges of the first concave member. Another of the inner bands has the first connecting end coupled with one of the first pair of side end edges of the first concave member and the second connecting end coupled with one of the second pair of side end edges of the second concave member. One of the outer bands has the first connecting end coupled with one of the second pair of side end edges of the second concave member, and the second connecting end coupled with one of the first pair of side end edges of the first concave member. Another of the outer bands has the first connecting end coupled with one of the first pair of side end edges of the first concave member, and the second connecting end coupled with one of the second pair of side end edges of the second concave member. The pair of inner bands criss-cross, when coupled with the first and second concave members. The pair of outer bands criss-cross when coupled with the first and second concave members. The pair of inner bands and the pair of outer bands are criss-crossed along a common intersection to form a hinge juncture when the pair of inner bands and the pair of outer bands are coupled to the first and second concave members. Lastly, a trailer member is included. The trailer member has a pair of trailer arms that are interconnected at a lower end. Each of the trailer arms has an upper member with an opening therethrough for allowing the cross bar to be positioned within. The lower end has a wheel shroud with an axile and a wheel. The lower end has a rotatable end mount. The trailer member is pulled by the person when coupled with the cross bar of the trailer hitch assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pedestrian trailer system which has all of the advantages of the prior art body trailers and none of the disadvantages.

It is another object of the present invention to provide a new and improved pedestrian trailer system which may be easily and efficiently manufactured and marketed.

It is further object of the present invention to provide a new and improved pedestrian trailer system which is of durable and reliable constructions.

An even further object of the present invention is to provide a new and improved pedestrian trailer system which is susceptible of a low cost of manufacture with regard to both materials and labor, and which accordingly is then susceptible of low prices of sale to the consuming public, thereby making such pedestrian trailer system economically available to the buying public.

Even still another object of the present invention is to provide a pedestrian trailer system for providing a system that will allow a person to transport materials without supporting the weight of the material on the body, and further allowing the person to move freely without restriction of movement when the pedestrian trailer system is supported about the waist of the person.

Lastly, it is an object of the present invention to provide a new and improved pedestrian trailer system including a trailer hitch assembly. The trailer hitch assembly has a first concave member and a cross bar that is releasably coupled thereto. A body support member is included. The body supper member is for positioning around a persons waist. The body support member has a second concave member and a belt member that is fixedly attached. A plurality of S-shaped bands form a pair of inner bands and a pair of outer bands. Each pair of bands is used to couple the trailer hitch member and the body support member. The pair of inner bands criss-cross when coupled with the first and second concave members. The pair of outer bands criss-cross when coupled with the first and second concave members. Lastly, a trailer member which has a pair of trailer arms is included. The pair of trailer arms have a lower end and an upper member. Each upper member has an opening therethrough for allowing the cross bar to be positioned within. The lower end has a wheel. The trailer member is to be pulled by a person when coupled with the cross bar of the trailer hitch member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the pedestrian trailer system constructed in accordance with the principles of the present invention.

FIG. 2 is a side elevational view of the operable components of the present invention.

FIG. 3 is an isometric view of the trailer of the present invention of FIG. 1.

FIG. 4 is a side elevational view of the trailer of the present invention.

The same reference numerals refer to the same parts through the various Figures.

DESCRIPTION OF THE PREFERRED EMBODIMENT

Figure 5:
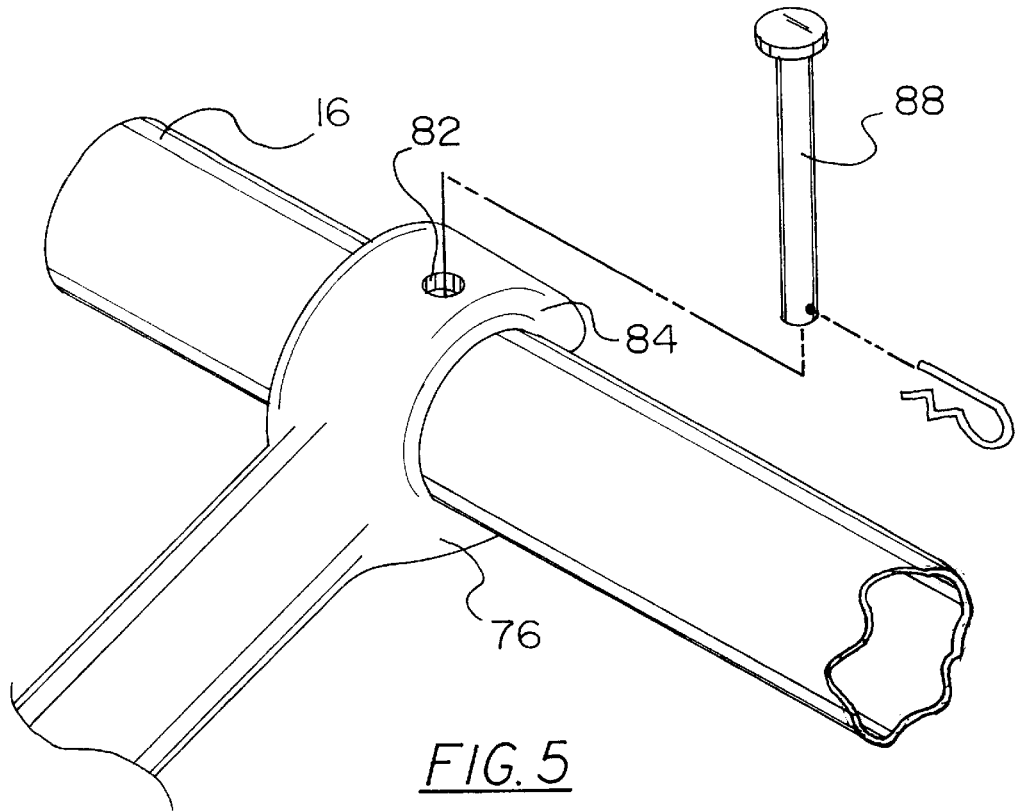
FIG. 5 is a cut-away view of the coupling of the upper member and the cross bar of the present invention.
Figure 6:
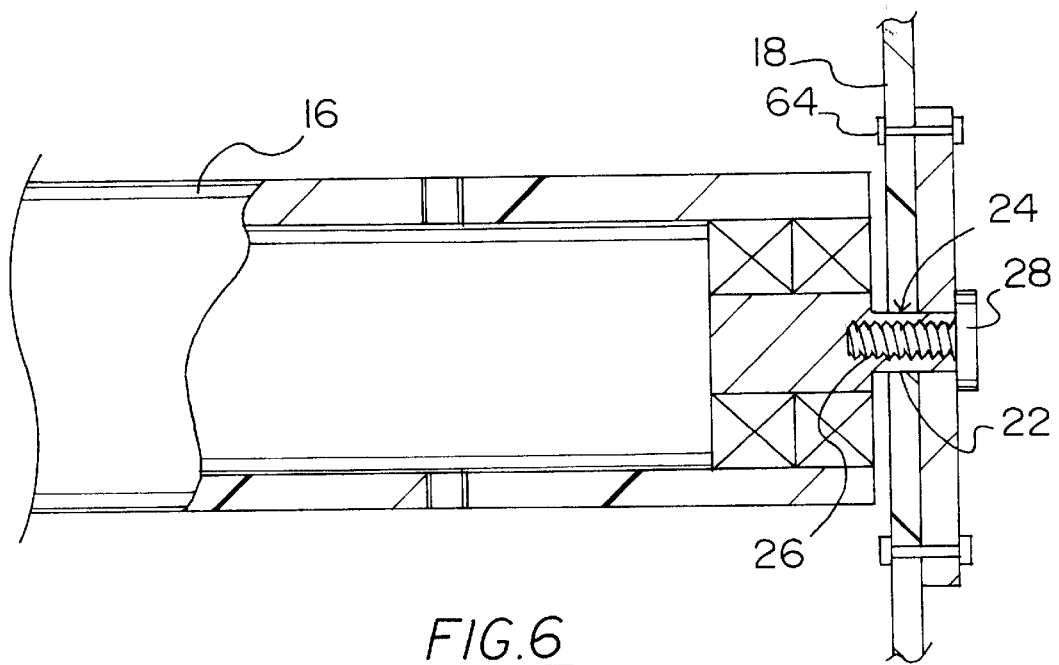
FIG. 6 is a cross sectional view of the coupling of the cross bar to the first concave member.

With reference now to the drawings, and in particular to FIGS. 1–8 thereof, the preferred embodiment of the new and improved pedestrian trailer system embodying the principles and concepts of the present invention and generally designated by the reference numeral 10 will be described.

The present invention, the pedestrian trailer system 10 is comprised of a plurality of components. Such components in their broadest context include a trailer hitch assembly, a body support member, a plurality of S-shaped bands and a trailer. Such components are individually configured and correlated with respect to each other so as to attain the desired objective.

Specifically, the present invention includes a trailer hitch assembly 12. As shown in FIG. 2, the trailer hitch assembly has a first concave member 14 and a cross bar 16. The first concave member has a first pair of side end edges 18 and a pair of side openings 22. The first concave member is a rigid structure made of plastic. The cross bar is hollow and formed of metal. The cross bar has a pair end posts 24 that project outwardly therefrom with one of the end posts depicted in FIG. 6. Each of the end posts has a threaded interior 26. One of each end post of the cross bar is positioned within one of each the side openings 22 for releasable coupling with the first concave member. A thumb screw is used to retain the cross bar when it is coupled to the first concave member. The thumb screw is non-restrictive and allows the cross bar to rotate within the side opening of the first concave member.

As best illustrated in FIG. 2, a body support member 32 is provided. The body support member has a second concave member 34 and a belt member 36. The second concave member is a rigid structure formed of plastic. The second concave member has interior padding 38 and a second pair of side end edges 42. The belt member, as shown in FIG. 2, is fixedly attached to the second pair of side end edges. The belt member has an adjustable buckle 44. The adjustable buckle allows the belt to be releasably coupled around a person's waist, as shown in FIG. 1. The padding is attached interiorly the second concave member and provides a safe and non-irritating surface for positioning against the body of the person.

Also, at least two, preferably four S-shaped bands 50 and 52 are included. Each band has a first connecting end 54 and a second connecting end 56. The four S-shaped bands form a pair of inner bands 60 and a pair of outer bands 62 that are used for coupling the trailer hitch assembly and the body support member. The S-shaped bands are formed of a flexible metal or plastic. The curve of each S band is sized for positioning over about ½ of the respective first or second concave members as shown in FIG. 2.

Additionally, one of the inner bands 60 has the first connecting end 54 coupled with one of the second pair of side end edges 42 of the second concave member 34, and the second connecting end 56 coupled with one of the first pair of side end edges 18 of the first concave member 14. Another of the inner bands has the first connecting end coupled with one of the first pair of side end edges 18 of the first concave member, and the second connecting end coupled with one of the second pair of side end edges 42 of the second concave member. One of the outer bands 62 has the first connecting end 54 coupled with one of the second pair of end edges 42 of the second concave member 34, and the second connecting end coupled with one of the first pair of side end edges 18 of the first concave members 14. Another of the outer bands has the first connecting end coupled with one of the first pair of side end edges of the first concave member, and the second connecting end coupled with one of the second pair of side end edges of the second concave member. Each S-shaped band is secured to the first concave member and the second concave member with a pair of rivets 64.

The first pair of inner bands 60 criss-cross and are coupled with the first and second concave members. The pair of outer bands 62 criss-cross when coupled with the first and second concave members. The pair of inner bands and the pair of outer bands are criss-crossed and alternate along a common intersection to form a hinge juncture 66, when the pair of inner bands and outer bands are coupled to the first and second concave members. The hinge juncture allows the trailer hitch assembly to rock from side to side, and the body member to rock from side to side for movement of the components with respect to each other.

Lastly, a trailer member 70 is provided. The trailer member, of FIG. 3, has a pair of trailer arms 72 that are interconnected at a lower end 74. Each of the trailer arms has an upper member 76 and an opening 78. The opening, as shown in FIG. 5, allows the cross bar 16 to be positioned within. An axle hole 82 is bored into a top portion 84 of each upper member. The axle hole of each upper member receives a locking pin 88 to fixedly couple the upper member and the cross bar of each trailer arm. The lower end, as seen in FIG. 3, has a wheel shroud 86 with an axle 90 and a wheel 92. The lower end, as seen in FIG. 4, as a rotatable end mount 96. The end mount will support a box for transporting material by the person wearing the system. The trailer member is pulled by the person when coupled with the cross bar of the trailer hitch assembly 12.

Figure 7:
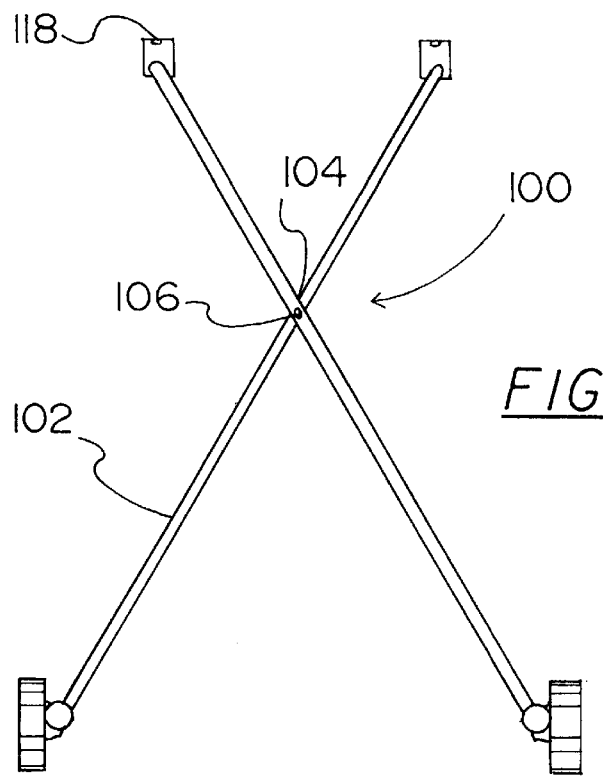
FIG. 7 is a frontal view of an alternative embodiment of the trailer.
Figure 8:
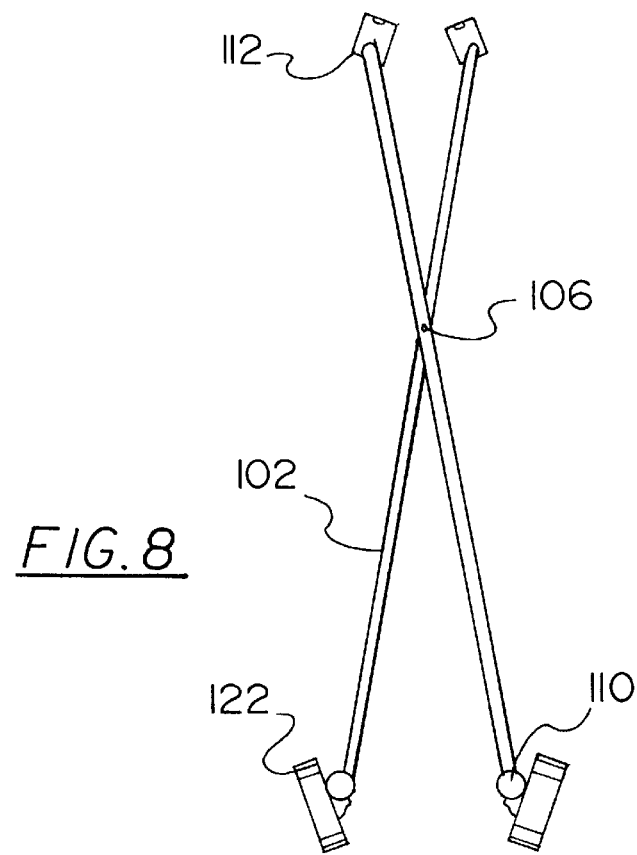
FIG. 8 is a frontal view of the alternative trailer in a closed orientation.

Furthermore, a trailer member 100 that has an alternative embodiment may be used. FIG. 7 shows that the alternative trailer member has a pair of trailer arms 102. Each arm has a central axial hole 104. The pair of trailer arms is crossed and each has a central axial hole in alignment for receiving a locking pin 106. Each trailer arm has a lower end 110 and an upper member 112. Each upper member has an opening 114 that will receive the cross bar 16 of the trailer hitch assembly. The cross bar and the upper member are coupled in the same manner as shown in FIG. 5. The upper member has an axial hole 118 that can receive a locking pin. Each lower end has a wheel 122. The alternative trailer member is pulled by the person when the pair of arms are coupled with the cross bar of the trailer hitch assembly 12.

The present invention pedestrian trailer system allows a user to transport materials without supporting the weight of the materials on his body or arms. The present invention, with its unique hinge juncture, allows the user to move freely without restriction of motion. Because S-shaped bands are used to form the hinge juncture, the hips and body of the person wearing the pedestrian trailer system may turn or swivel without bending or impediment. The present invention can be used to transport backpacks, golf clubs, child carriages, hunting or fishing equipment, groceries and briefcases. With the use of the threaded thumb screws, the trailer itself can be detached quickly from the trailer hitch assembly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the-invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pedestrian trailer system comprising, in combination:

a trailer hitch assembly having a first concave member and a cross bar, the first concave member having a first pair of side end edges and a pair of side openings therethrough, the cross bar having a pair of end post projecting outwardly therefrom, each of the end post having a threaded interiors one of each end post of the cross bar being positioned within one of each of the side openings for releasable coupling with the first concave member;

a body support member having a second concave member and a belt member; the second concave member having a second pair of side end edges, the belt member being fixedly attached to the second pair of side end edges, the belt member having an adjustable buckle for releasable coupling of the belt member around a persons waist;

four S-shaped bands with each band having a first connecting end and a second connecting end, the four S-shaped bands forming a pair of inner bands and a pair of outer bands being used for coupling the trailer hitch assembly and the body support member, one of the inner bands having the first connecting end coupled with one of the second pair of side end edges of the second concave member and the second connecting end coupled with one of the first pair of side end edges of the first concave member, another of the inner bands having the first connecting end coupled with one of the first pair of side end edges of the first concave member and the second connecting end coupled with one of the second pair of side end edges of the second concave member, one of the outer bands having the first connecting end coupled with one of the second pair of side end edges of the second concave member and the second connecting end coupled with one of the first pair of side end edges of the first concave member, another of the outer bands having the first connecting end coupled with one of the first pair of side end edges of the first concave member and the second connecting end coupled with one of the second pair of side end edges of the second concave member;

the pair of inner bands criss-cross when being coupled with the first and second concave members, the pair of outer bands criss-cross when being coupled with the first and second concave members, the pair of inner bands and the pair of outer bands being criss-cross along a common intersection for forming a hinge juncture when the pair of inner bands and the pair of outer bands being coupled to the first and second concave members; and a trailer member having a pair of trailer arms being interconnected at a lower end, each of the trailer arms having an upper member with an opening therethrough for allowing the cross bar to be positioned within, the lower end having a wheel shroud with an axle and a wheel, the lower end having a rotatable end mount, the trailer member being pulled by the person when coupled with the cross bar of the trailer hitch assembly.

2. A pedestrian trailer system comprising:

a trailer hitch assembly having a first concave member and a cross bar being releasable coupled thereto;

a body support member for positioning around a persons waist, the body support member having a second concave member and a belt member being fixedly attached thereto;

a plurality of S-shaped bands forming a pair of inner bands and a pair of outer bands, each pair of bands being used for coupling the trailer hitch member and the body support member, the pair of inner bands criss-cross when being coupled with the first and second concave members, the pair of outer bands criss-cross when being coupled with the first and second concave members; and a trailer member having a pair of trailer arms with a lower end and an upper member, each upper member having an opening therethrough for allowing the cross bar to be positioned within, the lower end having a wheel, the trailer member being pulled by the person when coupled with the cross bar of the trailer hitch member.

3. The pedestrian trailer system as set forth in claim 2, wherein the first concave member having a first pair of side end edges and a pair of side openings therethrough, and the cross bar having a pair of end post with one of each end post of the cross bar positioned within one of each of the side openings.

4. The pedestrian trailer system as set forth in claim 3, wherein the second concave member having a second pair of side end edges, and the belt member having an adjustable buckle for releasable coupling thereof.

5. The pedestrian trailer system as set forth in claim 4, wherein each band having a first connecting end and a second connecting end, and the pair of inner bands and the pair of outer bands being crisscross along a common intersection for forming a hinge juncture when the pair of inner bands and the pair of outer bands being coupled to the first and second concave members.

6. The pedestrian trailer system as set forth in claim 5, wherein one of the inner bands having the first connecting end coupled with one of the second pair of side end edges of the second concave member and the second connecting end coupled with one of the first pair of side end edges of the first concave member, and another of the inner bands having the first connecting end coupled with one of the first pair of side end edges of the first concave member and the second connecting end coupled with one of the second pair of side end edges the second concave member.

7. The pedestrian trailer system as set forth in claim 5, wherein one of the outer bands having the first connecting end coupled with one of the second pair of side end edges of the second concave member and the second connecting end coupled with one of the first pair of side end edges of the first concave member, and another of the outer bands having the first connecting end coupled with one of the first pair of side end edges of the first concave member and the second connecting end coupled with one of the second pair of side end edges the second concave.

8. The pedestrian trailer system as set forth in claim 2, wherein the lower end of the pair of arms having a wheel shroud with an axle connecting the wheel and wheel shroud, and the lower end having a rotatable end mount.

9. A pedestrian trailer system comprising:

a trailer hitch assembly having a first concave member and a cross bar being releasable coupled thereto;

a body support member for positioning around a persons waist, the body support member having a second concave member and a belt member being fixedly attached thereto;

a plurality of S-shaped bands forming a pair of inner bands and a pair of outer bands, each pair of bands being used for coupling the trailer hitch member and the body support member, the pair of inner bands criss-cross when being coupled with the first and second concave members, the pair of outer bands criss-cross when being coupled with the first and second concave members; and a trailer member having a pair of trailer arms with each arm having an central axial hole, the pair of trailer arms being crossed and having each central axial hole in alignment for receiving a locking pin, each trailer arm having a lower end and an upper member, each upper member having an opening therethrough for allowing the cross bar to be positioned within, each lower end having a wheel, the trailer member being pulled by the person when the pair of arms being coupled with the cross bar of the trailer hitch assembly.

\* \* \* \* \*